United States Patent
Yankielun

(10) Patent No.: US 6,526,189 B1
(45) Date of Patent: Feb. 25, 2003

(54) SCOUR SENSOR ASSEMBLY

(75) Inventor: Norbert E. Yankielun, Lebanon, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 58 days.

(21) Appl. No.: 09/878,997

(22) Filed: Jun. 13, 2001

(51) Int. Cl.[7] .............................. G02B 6/00; E02B 3/02; G01R 31/11
(52) U.S. Cl. ............................ 385/12; 405/73; 324/534
(58) Field of Search .............................. 385/12; 405/73

(56) References Cited

U.S. PATENT DOCUMENTS

| | | | |
|---|---|---|---|
| 4,289,398 A | 9/1981 | Robichaud | 356/73.1 |
| 4,968,880 A | 11/1990 | Beller | 250/227.21 |
| 5,151,966 A | 9/1992 | Brehm et al. | 385/128 |
| 5,383,015 A | 1/1995 | Grimes | 356/73.1 |
| 5,448,059 A | 9/1995 | Blank et al. | 250/227.21 |
| 5,708,500 A | 1/1998 | Anderson | 356/73.1 |
| 5,784,338 A | 7/1998 | Yankielun et al. | 367/131 |
| 5,790,471 A * | 8/1998 | Yankielun et al. | 367/13 |
| 6,046,797 A | 4/2000 | Spencer et al. | 356/73.1 |
| 6,100,700 A * | 8/2000 | Yankielun et al. | 324/534 |
| 6,121,894 A * | 9/2000 | Yankielun et al. | 340/870.31 |

* cited by examiner

*Primary Examiner*—Akm E. Ullah
*Assistant Examiner*—Tina M Lin
(74) *Attorney, Agent, or Firm*—John A. MacEvoy

(57) ABSTRACT

A optical scour sensor monitors scour, including deposition and ablation, in bodies of water that may be too lossy to enable use of electrical signals. A specially configured optical fiber is inserted into the sediment and the interface between the sediment and water thereby monitored using a top-mounted control box to pulse light down the cable and capture reflected signals. The optical fiber may be armored by a soft plastic concentric shield and incorporate a micro-bend inducer for detecting minute indentations in the fiber. The presence of a non-liquid, e.g., sediment, against the cable is detected because the sediment impinges on the fiber causing an indentation therein. At each indentation a reflection is sent back to the source. Using principles of optical time domain reflectometry (OTDR), the location of the indentiation is determined. The data are fed to a remote system for processing, analysis and display.

5 Claims, 5 Drawing Sheets

LIGHT RAY PATH IN UNDISTURBED FIBER

LIGHT RAY PATH IN CABLE WITH MICROBENDING CAUSED BY CONTACT WITH GRAVEL

Direct Connection

Short Fiber Connection

Long Fiber Umbilical

Telemetry

SCOUR SENSOR ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to detection and monitoring devices and is directed more particularly to an assembly for detecting and monitoring the presence of scour in underwater beds, such as river beds, navigational channels, and the like.

2. Description of the Prior Art

Scour is a severe problem that results in millions of dollars of damage to infrastructure and substantial loss of life annually. Scour occurs during times of high tides, hurricanes, rapid river flow, and icing conditions, when sediment, including rocks, gravel, sand, and silt, are transported by currents, undermining bridge and pier foundations, submarine utility cables, and pipelines, and filling in navigational channels. Scour is dynamic; ablation and deposition can occur during the same high energy hydrodynamic event. The net effect of scour has not heretofore been easily predicted, nor readily monitored, in realtime.

Bridge scour monitoring technologies are generally known. In U.S. Pat. No. 5,784,338, issued Jul. 21, 1998 to Norbert E. Yankielun et al, an instrument called a "time domain reflectomer" (TDR) is directly connected to a parallel transmission line consisting of a pair of robust, specially fabricated non-corroding rods or wires (hereinafter "leads"). The principle of TDR is generally known, described in the technical literature, and applied to numerous measurement and testing applications. The technique was applied to scour detection and monitoring in the aforesaid '338 patent, which is incorporated herein by reference. TDR operates by generating an electromagnetic pulse, or a fast rise time step, and coupling it to a transmission line. The pulse travels down the transmission line at a fixed and calculable velocity. The pulse propagates down the transmission line until the end of the line is reached, and is then reflected back toward the source. The time in seconds that it takes for the pulse to propagate down and back the length of the transmission line is called the "round trip travel time" and is calculated as described in the '338 patent.

For a two wire parallel transmission line, changes in the dielectric media in the immediate surrounding volume cause a change in the round trip travel time. Further, at any boundary condition along the transmission line (e.g., air/water and water/sediment), a dielectric discontinuity exists. As a pulse traveling down the transmission line from the TDR source encounters these boundary conditions, a portion of pulse energy is reflected back to the source from the boundary. A portion of the pulse energy continues to propagate through the boundary until another boundary, or the end of the cable, causes all or part of the remaining pulse energy to return along the transmission line toward the source. Measuring the time of flight of the two reflected pulses, and knowing the dielectric medium through which the pulse is traveling, permits calculation of the physical distance from the TDR source to the dielectric interface boundary, or boundaries, encountered.

Freshwater has a relatively high dielectric constant and dry sedimentary materials (e.g.: soil, gravel and stone) have a relatively low dielectric constant. Wet sediment has a dielectric constant that is a mixture of the constants of water and dry soil. The dielectric constant of this mixture will vary, depending upon the local sedimentary material constituency. However, in all cases of bulk dielectric, the bulk index of refraction of the mixture will be less than that of liquid water alone and significantly greater than that of the dry sedimentary materials. Some sediment materials, particularly clay-based sediments, can be extremely "lossy". This lossy behavior of the soil is exhibited by a severe attenuation of an electromagnetic pulse as it propagates along a transmission line surrounded by such materials. The pulse, when launched from a TDR, dissipates as it travels along the transmission line. In lossy consolidated soils, such as clay, the electromagnetic signal is greatly attenuated as it propagates along the imbedded transmission line leads. Levels of signal attenuation can be as much as 10's of decibels per meter. This results in little or no reflected signal returned to the instrument over the length of the leads buried in the lossy media. If the sensor source is imbedded in lossy media, along with a portion of the sensor leads, the media can absorb all, or nearly all of the pulse energy, such that little or no reflected signal is returned. If a pulse is propagating along a transmission line imbedded in a non- or minimally-lossy material and a boundary with some extremely lossy material is encountered, a reflection will occur at the interface boundary, similarly to that that would occur for a boundary between two non-lossy materials. The magnitude of the reflection will be proportional to the reflection coefficient of the two materials at the interface.

When one or both of the reflected signals from the interface and the distal ends of the leads are severely weakened by attenuation, the TDR electronics can experience difficulty in discerning one from the other and in providing consistently accurate readings. As the loss factor of the surrounding material increases, the pulse propagating along an electronic TDR system is greatly attenuated. In lossy environments, such as brackish or saline water, the pulse often is attenuated to levels below what can be procured or recognized by the TDR system.

Accordingly, there is a need for a reflectometry system which provides distinct and useful signals reflected from a boundary layer on a continuing basis so as to provide reliable monitoring of scour conditions in real-time, even in lossy environments.

SUMMARY OF THE INVENTION

An object of the invention is, then, to provide a reflectometry system for operation in lossy environments and, which provides readily discernible signals reflected from a boundary layer and a distal end of a sensor, which signals are sufficiently robust for use in determining the position of the boundary layer on a real-time basis and thereby permit continuous monitoring of the boundary layer position.

With the above and other objects in view, as will hereinafter appear, a feature of the invention is the provision of a scour sensor assembly comprising an optical TDR system including a fiber optic cable for disposition in a water/sediment interface such that a first portion of a length of the cable is disposed in sediment below the interface and a second portion of the length of the cable is disposed in water above the interface. A light pulse assembly is fixed at a first end of the cable and adapted to send periodic light pulses through the cable toward a second end of the cable and to receive pulses reflected from irregularities in surface walls of the cable. The light pulse assembly is adapted to compute travel times of the reflected pulse and to determine therefrom depth of the interface on a continuing basis.

The above and other features of the invention, including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1A:
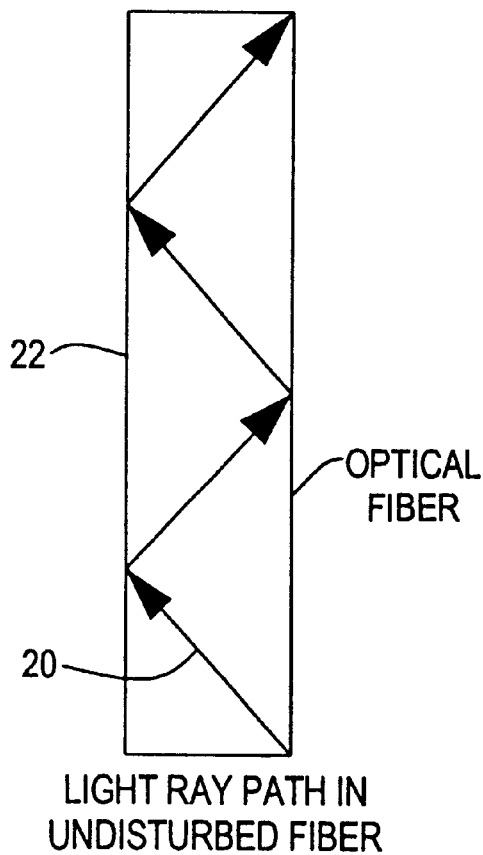
FIG. 1A is a diagrammatic representation of an optical fiber having no irregularities in the wall thereof, and showing a light ray path therethrough.
Figure 1B:
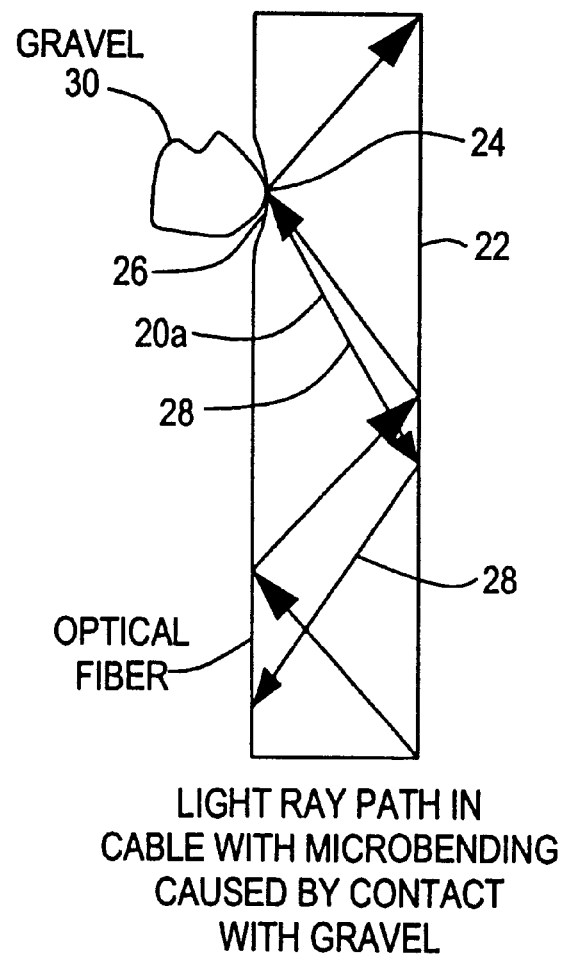
FIG. 1B is similar to FIG. 1A, but illustrating light ray paths upon the light ray's encountering an irregularity in the fiber wall.

Optical time domain reflectometry (OTDR) is employed in the system described herein. OTDR functions conceptually similarly to metallic TDR. The main difference between metallic TDR and OTDR is that OTDR relies on photonic energy and an optical waveguide, while TDR relies on electromagnetic energy and a metallic transmission line. An advantage of an appropriately configured optical fiber sensor is that it is impervious to the effects of water conductivity. In an OTDR system, a pulse 20 (FIG. 1A) is generated and transmitted by a laser or light-emitting diode, or the like, coupled to a fiber optic cable 22. The pulse 20 propagates along the fiber optic cable 22 at a constant rate of speed. Light travels through the fiber at a speed that is a function of the speed of light in a vacuum. This velocity is directly related to the speed of light and the index of refraction of the fiber. If there are any irregularities in the fiber, as would be caused by a break, sharp bend, external point pressure 24 (FIG. 1B), or other mechanical displacement or disturbance to the fiber, a fraction 20a of the pulse energy 20 is reflected back from the irregularity 24 toward the pulse source.

Point mechanical pressure on the cable 22 creates "microbends" 26 (FIG. 1B) which result in backscatter 28 of photonic energy towards the source along the cable 22. The time that is required for the pulse to propagate from the source and back to the source from the irregularity 24 is known as the "round trip travel time" and can be calculated similarly to metallic TDR calculations, but OTDR is based only on the index of refraction of the cable itself, and not the surrounding dielectric materials. This technique is especially useful in brackish, saline or otherwise conductive water environments, permitting scour to be continuously monitored and measured without regard to the "lossiness" of the soil in which the cable 22 is embedded.

This optically-based system exploits microbending along the fiber cable 22 (FIG. 1B) due to the irregular, but localized impingement and packing of granular materials 30 (e.g., sand and gravel) in the matrix of a surrounding saturated sediment column. Microbending is not induced along a cable segment 32 (FIG. 2) in the overlying water column 34 inasmuch as there are no point forces applied to the cable.

Figure 2:
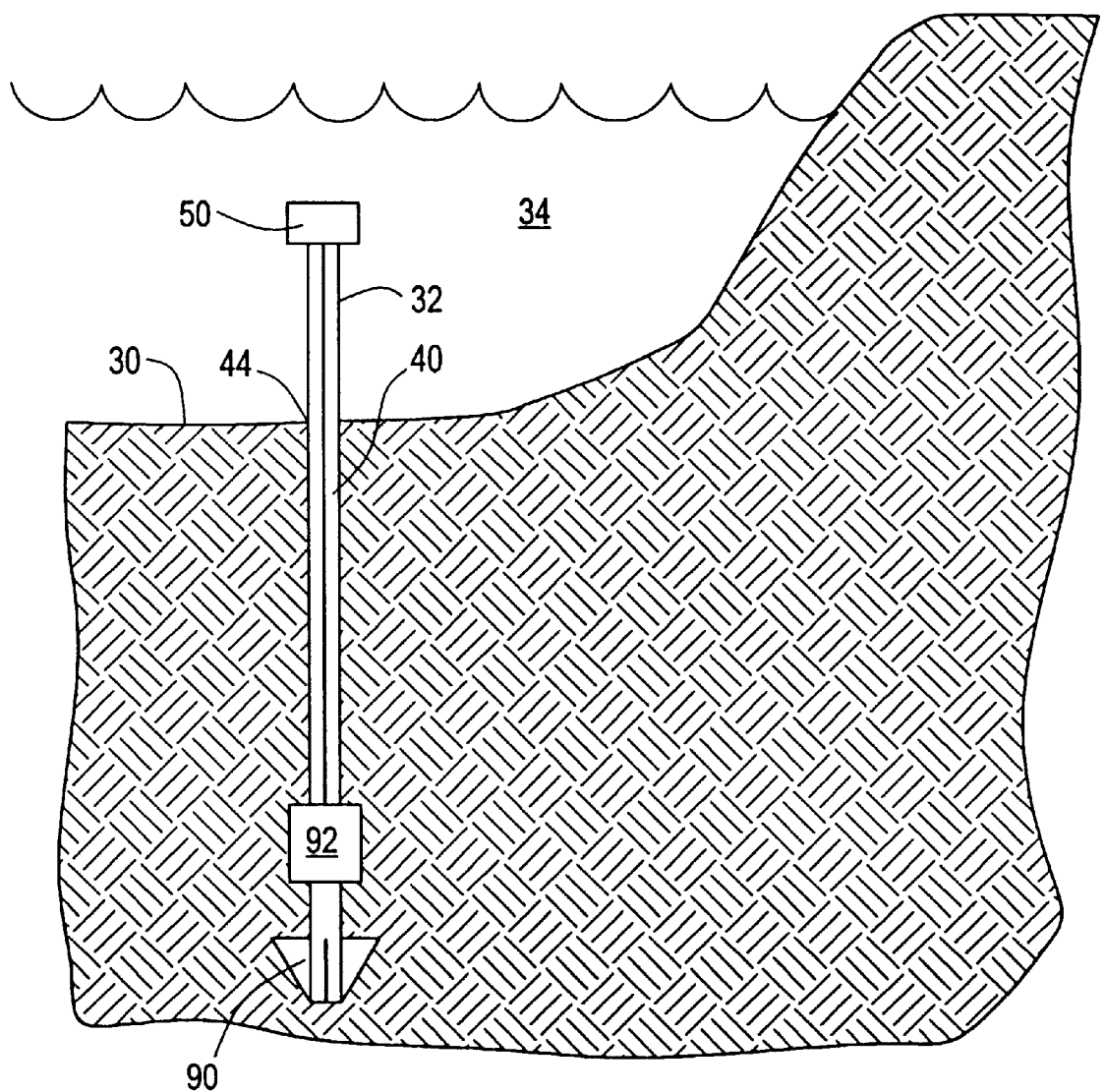
FIG. 2 is a diagrammatic view of one form of an optical scour sensor assembly illustrative of an embodiment of the invention.
Figure 4:
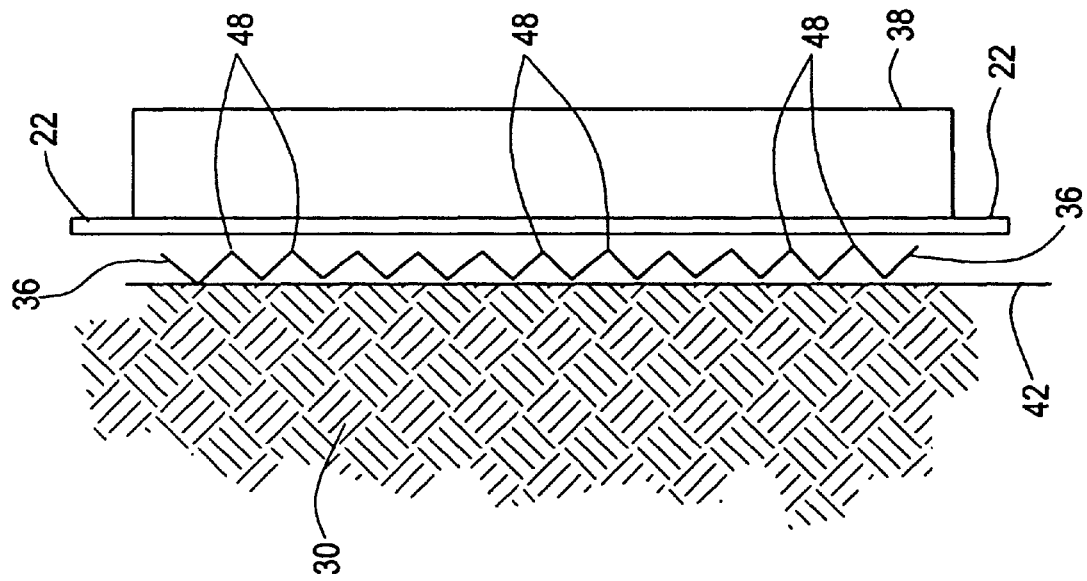
FIG. 4 is a sectional view taken along line IV—IV of FIG. 3.
Figure 3:
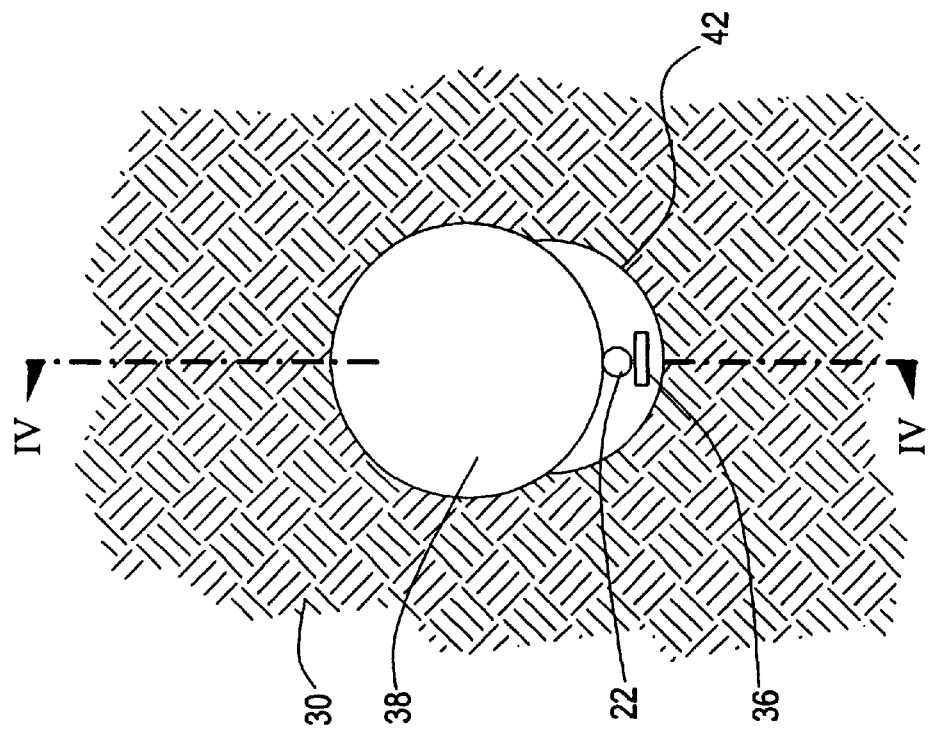
FIG. 3 is a top plan view of a fiber optic cable assembly portion of the scour sensor assembly.

In practice, the optical fiber 22 (FIGS. 3 and 4) is mounted on a rigid supporting structure 38 which is vertically positioned so that a portion 40 of the cable 22 is imbedded in the sediment column 30 and the portion 32 of the cable 22 is submerged in the overlying water 34 (FIG. 2). In a practical implementation, the sensor fiber cable 22 may be "hardened" with appropriate flexible armoring 42 (FIGS. 3 and 4) that permits the development of microbends 26 in the sensor fiber 22. The vertical location of the interface, or boundary change region 44 (FIG. 2), from which microbending 26 occurs along the cable portion 40, is apparent.

Preferably, a microbend inducer 36 (FIGS. 3 and 4) is provided within the armoring 42 adjacent the fiber optic cable 22 and extends along the length of the cable 22. The microbend inducer 36 is an elongated strip of a configuration to provide width-wise ridges 48 (FIG. 4) spaced along the length of the strip. The armoring 42 is of a soft plastic material. Sediment impinging against the armoring 42, causes the soft armoring to extend inwardly which, in turn, applies pressure on the microbend inducer 36, causing one or more of the ridges 48 of the microbend inducer 36 to engage the fiber optic cable 22 to create a microbend 26.

The system preferably is implemented with an opto-electronic package 50 (FIG. 2) at the top of the fiber optic cable 22. Placing the opto-electronics 50 at the top of the cable 22 has a significant signal processing advantage and is the preferred implementation. With the electronics at the top of the cable, the system is able to measure along the water-exposed section 32 of the cable. In this manner, two clearly definable boundaries will be apparent. A reflection will be clearly visible at the start of the cable, and the boundary between the section 32 of the cable immersed in water and the section 40 of the cable imbedded in sediment 30 will be apparent. The water/sediment boundary 44 will be delineated by a region creating no reflections (water) and a region generating a constellation of reflections (sediment). By monitoring the change in distance (travel time) between the top of the cable reflection and the water sediment boundary, the progress of scour (or deposition) can be dynamically tracked.

While the opto-electronic package 50 may be provided at the bottom of the cable, the sensor is then "looking" through the constellation of microbend-induced reflections up towards the sediment/water boundary 44. A significant portion of the transmitted energy may be backscattered from the region of sediment-induced microbends, potentially preventing sufficient energy from propagating into the portion of the fiber cable exposed in the water column. With little energy propagating through the fiber beyond the sediment column, into the overlying water column, a reflection from the sediment/water boundary may not be easily discernible.

Figure 5:
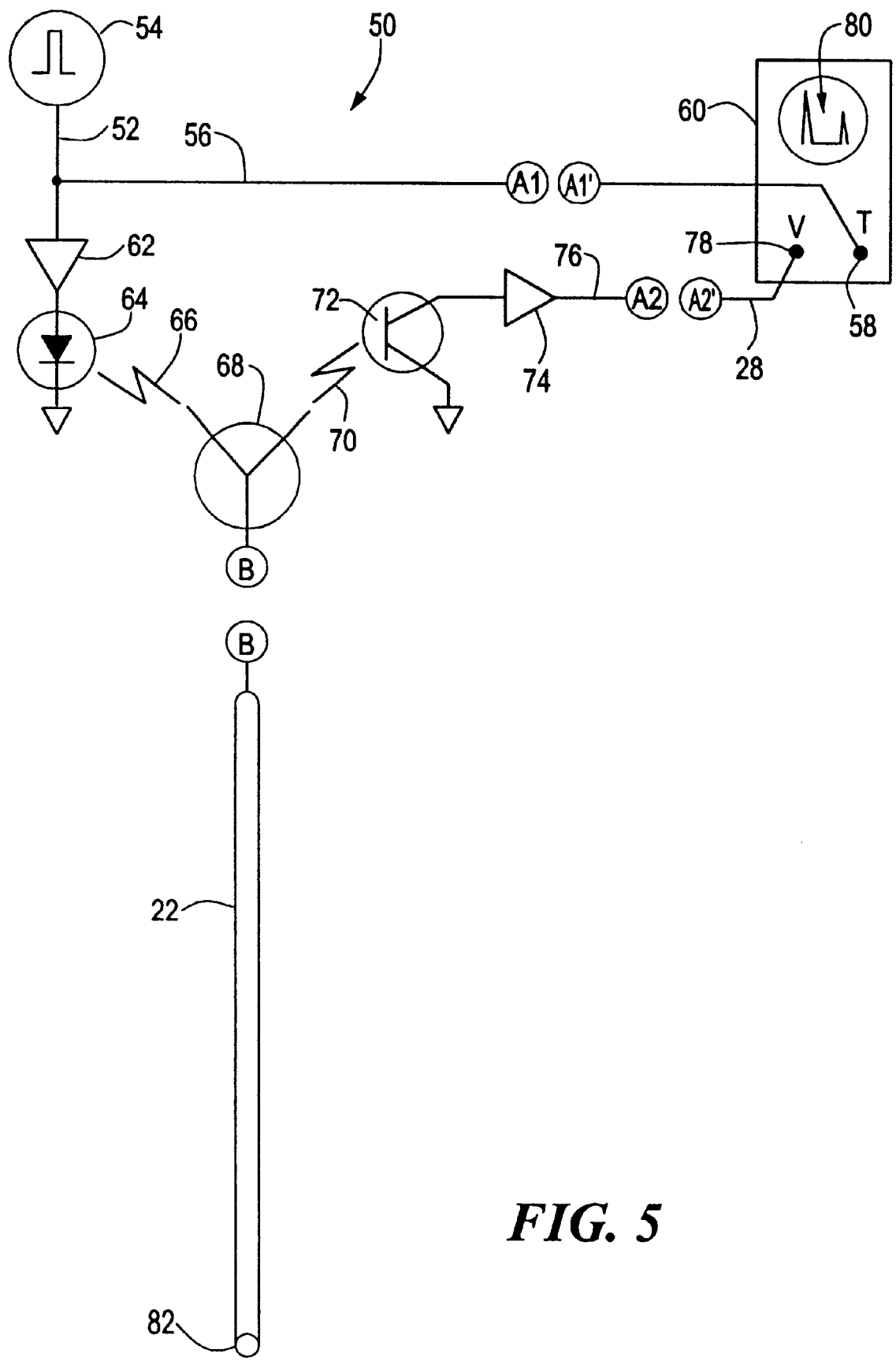
FIG. 5 is an electrial schematic of a light pulse assembly portion of the scour sensor assembly.

Referring to FIG. 5, it will be seen that in the optoelectronic package 50 a train of photonic pulses 52 are generated by a pulse generator 54 with a low duty cycle relative to the pulse width. The pulse 52 is directly connected by a cable 56 to a trigger input 58 of an oscilloscope 60. The same pulse is appropriately amplified, as by amplifier 62, and used to energize a laser diode 64. A light pulse output 66 from the laser diode 64 is optically coupled through a splitter 68, or optical directional coupler, to the optical fiber 22. A reflected output pulse 70 from the optical fiber 22 is coupled through the splitter 68, or optical directional coupler, to a fast response phototransistor 72, or similar device. The output of the phototransistor 72 is amplified by an amplifier 74, connected by cable 76 to a vertical amplifier 78 of the oscilloscope 60. A resulting trace 80 on the oscilloscope 60 displays the reflections resulting from all the microbends 26 and termination 28 along the optical fiber 22.

Figure 5A:
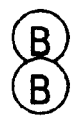
FIGS. 5A–5E are diagrammatic illustrations of alternative embodiments of portions of the pulse assembly.
Figure 5B:
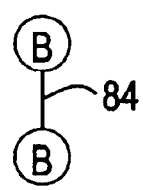
Figure 5C:
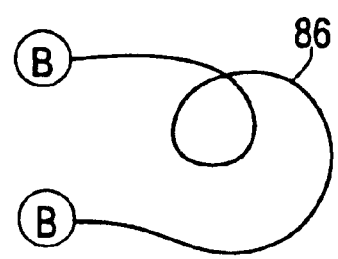
Figure 5D:
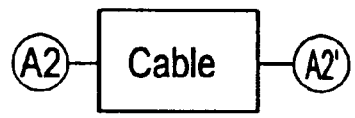
Figure 5E:
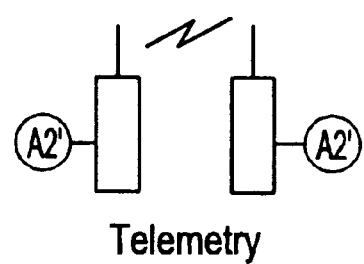

With the appropriate hardware, an OTDR scour monitor connection B—B between the splitter 68 and the optical fiber 22 can be implemented by direct connection of the splitter 68 to the optical fiber 22 (FIG. 5A), or by using a directly-connected optical short fiber connector 84 (FIG. 5B), or by using a long fiber umbilical cable 86 (FIG. 5C). By using a cable 88 (FIG. 5D) or radio, ultrasonic, or other form of remote telemetry (FIG. 5E) the sediment scour information from the sediment-buried optical fiber can be transmitted to an on-shore OTDR oscilloscope, analyzer, and storage system (not shown).

A cable-based system (FIGS. 5C and 5D) is primarily intended for long-term or permanent monitoring situations where the umbilical cable may be easily and more permanently installed. This usually requires a physically short distance (for economic and signal attenuation considerations) between the optical fiber and the remote oscilloscope, analyzer and storage system. An implementation using batteries and a wireless radio, or submerged acoustic telemetry link, is intended for shorter-term applications, where the cable 22 can be retrieved, perhaps annually, for refurbishing and replacement of batteries. In highly conductive waters, radio telemetry may be unusable due to high signal attenuation.

In installation, the scour sensor cable 22 is buried in river bottom sediments and anchored, as by anchor flukes 90 and/or an anchor weight 92 (FIG. 2), at a point below the maximum expected depth of scour.

Primarily, the sensor assembly is designed for installation by "air jetting" or "hydro jetting". Alternatively, the sensor can be installed in softer sediments by being "pile driven" or hydraulically forced into the sediments. The top of the sensor is "surveyed in" relative to a local survey benchmark.

Following installation, an initial reference reading is made of the sensor signal response, and the round trip travel time for a pulse propagating along each sensor lead is calculated and stored in an associated computer. Subsequent signal responses and round-trip propagation times are frequently and automatically (or manually, if desired) acquired, calculated, and compared with the original reference data set. A real-time computer algorithm may be used to compare the reference round-trip travel time with subsequent values, and trigger an alarm when a significant change is observed in the sensor signal response or a threshold difference in round trip travel time is reached. Depending on the desired implementation, sensor output signals can be multiplexed to monitor a sensor array consisting of numerous sensor assemblies installed in close proximity to a structure or sediment field of interest.

There is thus provided an assembly for scour monitoring, which assembly can operate in brackish, saline or otherwise electrically conductive waters.

While the above-described assembly has been discussed primarily with respect to scour monitoring, and while it is envisioned that the assembly will be most beneficial in that context, it will be apparent that the assembly can well be applied in other related areas, such as depth change measurement/monitoring, environmental monitoring, navigation channel sedimentation monitoring, and dredging spoils stability monitoring.

It is to be understood that the present invention is by no means limited to the particular constructions herein disclosed and/or shown in the drawings, but also comprises any modification or equivalent within the scope of the claims.

What is claimed is:

1. A scour sensor assembly comprising:

a fiber optic cable for disposition in a water/sediment interface such that a first portion of a length of said cable is disposed in sediment below the interface and a second portion of the length of said cable is disposed in water above the interface; and a light pulse assembly fixed at a first end of said cable and adapted to send periodic light pulses through said cable toward a second end of said cable and to receive pulses reflected from irregularities in surface walls of said cable, said light pulse assembly being adapted to compute travel times of the reflected pulses and to determine therefrom depth of the interface on a continuing basis.

2. The assembly in accordance with claim 1 and further comprising a protective flexible armoring disposed around the fiber optic cable.

3. The assembly in accordance with claim 2 wherein said fiber optic cable and armoring is mounted on a rigid supporting structure.

4. The assembly in accordance with claim 2 and further comprising a microbend inducer extending alongside said fiber optic cable within said protective armoring.

5. The assembly in accordance with claim 4 wherein said microbend inducer comprises an elongated member provided with widthwise extending ridges along a length thereof.

* * * * *